Patented Dec. 1, 1931

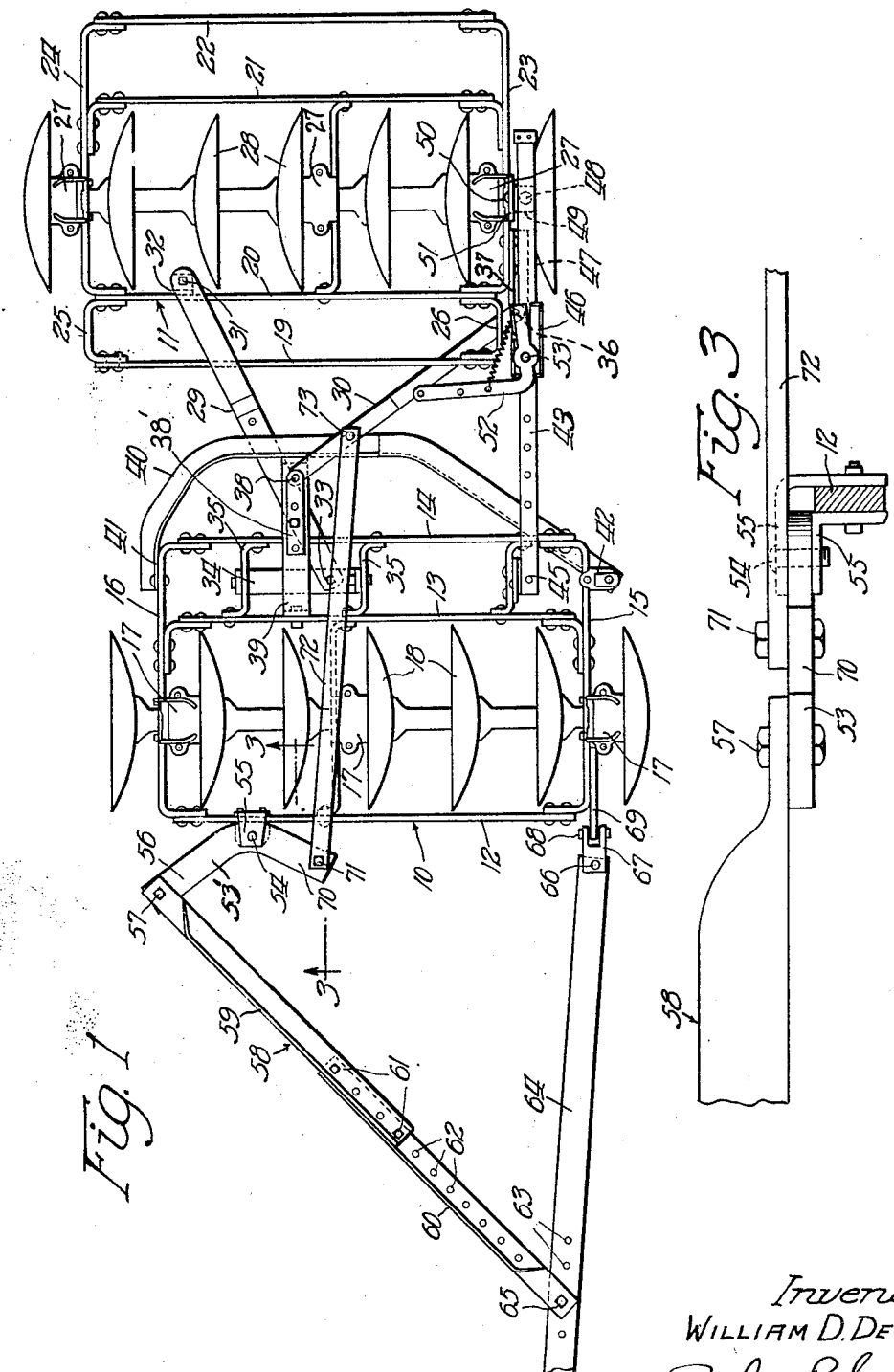

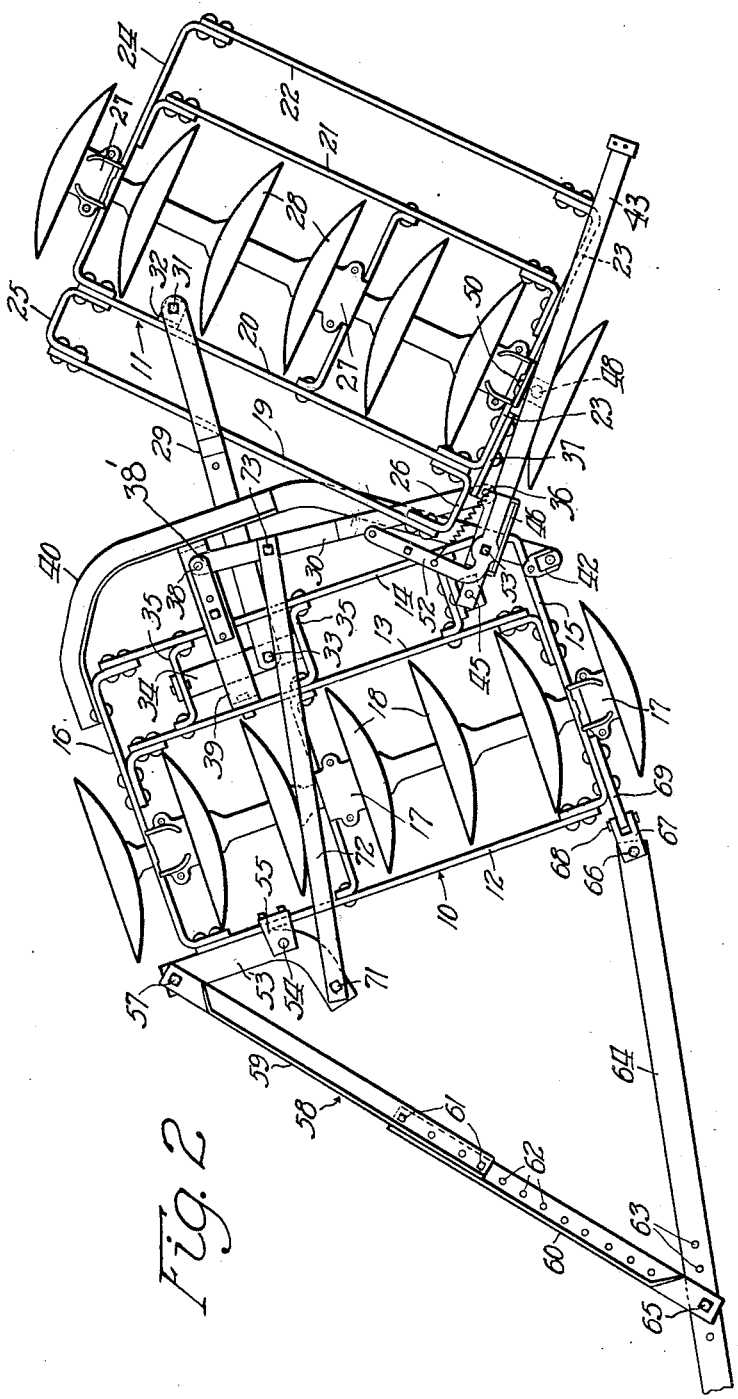

1,834,519

UNITED STATES PATENT OFFICE

WILLIAM D. DEWEND, OF SOUTH BEND, INDIANA, ASSIGNOR TO OLIVER FARM EQUIPMENT COMPANY, A CORPORATION OF DELAWARE

OFFSET TANDEM HARROW

Application filed October 31, 1929, Serial No. 403,871. Renewed April 25, 1931.

This invention relates to a tandem offset disk harrow adapted for orchard cultivation, and so designed that the harrow will travel in cultivating or working angle on either side of the path of travel of the tractor.

Heretofore, tandem offset harrows which have been used in connection with orchard cultivation have only been capable of being offset in angular working position on one side of the longitudinal center of the tractor with the result that continued and repeated cultivation of the same land, causes the land to become uneven. It is, therefore, the primary object of the present invention to provide a novel and improved offset tandem harrow in which the gangs thereof may be set in working angle at either the left or right hand side of the tractor for the primary purpose of keeping the land level.

A further object of the invention provides an improved offset tandem harrow which will permit the controlling of the angling action of the front and rear gangs when the harrow is offset to the left of the tractor without the necessity of changing the course of the tractor.

These and other objects are accomplished by providing a construction and an arrangement of the various parts in the manner hereinafter described, and particularly pointed out in the appended claims.

Referring to the drawings,

Fig. 1 is a top plan view of my improved form of tandem offset harrow in which the front and rear gangs thereof are shown in parallel relation to each other.

Fig. 2 is a top plan view of the same with the front and rear gangs thereof adjusted to their working angle for attachment to the tractor on the right hand side thereof; and Fig. 3 is an enlarged fragmentary detail view showing the bell crank construction of one of the draft connections.

The present invention is directed to an improvement over the construction of the offset tandem harrow described and claimed in my co-pending application Serial No. 343,701, filed March 1, 1929. The offset harrows heretofore constructed have been capable of being offset to the right of the tractor only when in working angle. Obviously repeated cultivation by the tandem disk harrow which is capable of being offset only on one side of the tractor after repeated cultivations of the orchard where these types of harrows are used will eventually result in the soil accumulating and piling up under the trees, causing the land to be uneven. The primary purpose, therefore, of the present invention is to provide a tandem offset harrow which is capable of being adjusted to its working angle and offset on either the right or left hand side of the tractor, so that on successive cultivations of the same orchard or field, the harrow may be successively offset on the right or left hand side of the tractor for maintaining the land in a relatively level condition.

For the purpose of illustration, I have shown one embodiment of my invention in connection with a tandem offset harrow which comprises a front gang frame generally indicated by the reference character 10, and a rear gang frame 11. The front gang frame 10 comprises a front transverse frame member 12, an intermediate transverse frame member 13, and a rear transverse frame member 14. These three transverse frame members are connected in any well known manner by longitudinal side frame members 15 and 16. Journalled in suitable outer and intermediate bearings 17, which are secured to the front gang frame 10, is a disk gang shaft (not shown) on which is journalled the usual disks 18. The rear gang 11 similarly comprises two front transverse frame members 19 and 20, and also two rear transverse frame members 21 and 22. The transverse frame members 20, 21 and 22 are secured together by longitudinally extending side frame members 23 and 24 in any well known manner. The forward transverse frame member 19 is secured to the transverse frame member 20 by U-shaped brackets 25, 26. Journalled in suitable outer and intermediate brackets 27, which are secured to the rear gang frame 11 in any well known manner, is a disk shaft (not shown) on which are journalled the usual disks 28. The disks 18 and 28 of the respective front and rear gangs are of the usual concavo-convex type in which the convex surface thereof of the front gangs is directed in the opposite direction from that of the rear gangs, as clearly shown in Fig. 1 of the drawings.

In the same manner described in my aforementioned pending application, the front and rear gangs are pivotally connected together by means of two links generally indicated by the reference characters 29 and 30. The rear end of the link 29 is pivotally connected as shown at 31 to a bracket 32 secured to the transverse frame member 20. The forward end of the link 29 is pivotally connected as shown at 33 to the front gang frame through the medium of the U-shaped bar 34, which in turn is secured to two longitudinally extending Z-shaped bars 35. These Z-shaped bars are in turn secured between the rear transverse frame members 13 and 14 of the front gang frame 10 in any well known manner. The rear end of the link 30 is pivotally connected as shown at 36 to the rear gang frame through the medium of an angled bracket 37 secured to the side frame member 23. The forward end of the link 30 is pivotally connected as shown at 38 between a bracket 38' and a longitudinally extending and substantially U-shaped bar 39, which has its front end secured to the transverse frame member 13, and its rear end thereof secured to a curved guide or angle member 40. The guide or angle member 40 is secured as shown at 41 to the side frame member 16 of the front gang frame 10. The other end of the angle guide member 40 is adjustably secured for vertical adjustment to the side frame member 15 by means of adjustable bracket 42. After the manner described in my previously referred to co-pending application, the front and rear gangs are locked in various angular working positions by a longitudinally extending locking bar 43, which has its forward end pivoted to the front gang frame as shown at 45, and its rear end thereof slidably mounted in a block 46, which in turn is secured to a rearwardly extending bar 47. The bar 47 is pivotally connected as shown at 48 to an angle bracket as shown at 49. The angle bracket 49 in turn is pivotally connected as shown at 50 to a vertically extending plate 51. The locking of the locking bar in various positions of adjustment is accomplished through the medium of a bell crank lever 52, which is pivoted at 53 to the sliding block 46. Associated with the lever 52 is a pawl (not shown), which is of the construction described and claimed in my aforementioned co-pending application. This bell crank lever 52 may be connected by means of a rope to the operator's seat on the tractor.

The construction of the offset tandem harrow thus far described is essentially identical with the construction described and claimed in my previous mentioned co-pending application, and for that reason it is believed that a more detailed description of the construction and operation of this mechanism is not necessary.

The essential feature of the present invention consists in a novel arrangement for connecting up the draft connections, which facilitates the adjustments or the angling of the disk gangs with respect to each other, regardless of the relative position of the tractor with respect to the harrow.

This mechanism comprises a bell crank lever 53' which is pivoted as shown at 54 between two L-shaped brackets 55, which in turn are secured to the front rear sides of the transverse frame member 12 of the front gang frame 10. (See Fig. 3.) The outer end or arm 56 of the bell crank 53' is pivotally connected as shown at 57 to an adjustable draft connection generally indicated by the reference character 58. This adjustable draft connection 58 comprises two sections 59 and 60 by means of which the length of this draft member 58 may be lengthened or shortened by adjusting the bolts 61 in the various apertures 62 in the section 60 of the draft member. The forward end of the draft member 58 in turn may be adjustably secured in the various apertures 63 in the primary draft member 64 by the medium of a bolt 65. The rear end of the draft member 64 is pivotally connected for horizontal movement as shown at 66 to a pivotal bracket 67, which in turn is pivotally connected to a pin 68 mounted in a bar 69 secured to side frame member 15 of the front gang frame 10. The inner arm 70 of the bell crank 53'' is pivotally connected as shown at 71 to a rearwardly extending link 72. The link 72 is pivotally connected as shown at 73 to the link 30 at a point adjacent the forward pivot 38 of the link 30.

The operation of my improved offset disk harrow is as follows:

Let us assume that the disk gangs are in their parallel position or the position shown in Fig. 1 of the drawings, and that the operator desires to throw the gangs in working angle or the position shown in Fig. 2, or any intermediate working angle within the range of the locking device. The rope connecting the bell crank 52 with the operator's seat on the tractor is pulled forward at the time the tractor is backed, at which time the bell crank 53' revolves in a clockwise direction when looking at Fig. 1, causing arm 56 of the bell crank to assume a position parallel to the transverse frame member 12 of the front gang frame 10. This movement of the bell crank to this position pulls the connecting link 72 forwardly, which in turn pulls the link 30 forwardly about its pivot 38, causing the left hand end of the rear gang to move forwardly, and by reason of the rearward movement of the draft bar 64, the left hand end of the front gang frame will move rearwardly until the gangs assume their working angle or the position shown in Fig. 2. When the gangs assume the position shown in Fig. 2, the locking mechanism will then lock the gangs in this working angle. If the operator desires to straighten the gangs or change the angle of the gangs from the position shown in Fig. 2 to that shown in Fig. 1, the locking mechanism is released, and when the harrow is pulled in a straight forward direction, the bell crank 53 will revolve about its pivot 54 in a counter-clockwise direction, forcing the inner arm 70 rearwardly, which in turn forces the connecting link 72 rearwardly, this link in turn forces the link 30 rearwardly about its pivot 38 at the same time the draft connection 64 pulls the right hand end forwardly until the gangs assume their parallel position with respect to each other.

From the above description it will be readily seen that the operation of angling the gangs with respect to each other is not only greatly facilitated, but that they may be angled with respect to each other regardless of the relative position of the tractor with respect to the harrow. In other words, the gangs may be angled to and from their working angular position with just as great facility and ease whether the harrow is offset to the right or to the left of the tractor, it being understood, of course, that by merely adjusting the draft connections, that is shortening or lengthening the draft member 58, that the gang may be offset either to the right or left of the tractor, so that the cultivation of the soil especially in orchards may be such that on consecutive cultivations of the soil, the tractor is offset successively on the right and left of the tractor, so that the soil will be maintained in substantially level condition.

While in the above specification I have disclosed an embodiment which my invention may assume in practice, it will of course be understood that the same is capable of modification, and that modification may be made without departing from the spirit and scope of the invention as expressed in the following claims:

What I claim as my invention, and desire to secure by Letters Patent is:

1. A tandem disk harrow comprising a front frame and a rear frame, disk gangs mounted in each of said frames, means for pivotally connecting said frames together, means forming the draft connection between the front frame and the source of draft power, and means forming connection between said draft connection and said first named pivotal connection for controlling the angular movement of said gangs with respect to each other.

2. A tandem disk harrow comprising a front frame and rear frame, disk gangs mounted in each of said frames, means for pivotally connecting said frames together, movable draft connections connected with said front frame, and a link operatively related to said draft connections and said pivotal connections for effecting angular adjustment of said gangs with respect to each other by the draft applied to said draft connections.

3. A tandem disk harrow comprising a front frame and a rear frame, disk gangs mounted in each of said frames, means including a plurality of links pivoted at their forward end to the front gang frame, and pivotally connected at their rear ends to the rear gang frame, relatively movable draft connections connected to the front gang frame, and means operatively connecting said draft connections with said links for effecting an angular adjustment of said gangs with respect to each other by the draft applied to said draft connections.

4. A tandem offset disk harrow comprising a front frame and a rear frame, disk gangs mounted in each of said frames, means including a plurality of links pivoted at their forward and rearward ends to the front and rear gang frames respectively, relatively movable draft connections connected to the front gang frame, and means for operatively connecting said movable draft connections with one of said links for effecting the angular adjustment of said gangs with respect to each other.

5. A tandem offset disk harrow comprising a front frame and a rear frame, disk gangs mounted in each of said frames, means including a plurality of links pivoted at their forward and rearward ends to the front and rear gang frames respectively, and means operatively connecting said draft connections with one of said links at a point adjacent the forward pivot thereof for effecting an angular adjustment of the gangs with respect to each other by the draft applied to said draft connections.

6. A tandem offset disk harrow comprising a front frame and a rear frame, disk gangs mounted in each of said frames, means including a plurality of links pivoted at their forward and rearward ends to the front and rear gang frames respectively, relatively movable draft connections connected to the front frame including a bell crank having one end thereof connected to one of said draft connections, and a connecting bar having its forward end connected to the other end of said bell crank, and its rearward end connected to one of said links for effecting the angular adjustment of said gang with respect to each other by the draft applied to said draft connections.

7. A tandem offset disk harrow comprising a front disk gang and a rear disk gang, means including a plurality of links for pivotally connecting said front and rear disk gangs together, relatively movable draft connections connected to the front gang, and means forming connections between said draft connection and one of said links whereby said gangs may be adjusted to various angular relations with respect to each other, regardless of whether the harrow is offset to the right or to the left of the draft appliance.

8. A tandem offset disk harrow comprising a front gang frame and a rear gang frame, disk gangs mounted in each of said frames, means including a plurality of links pivoted at their forward and rearward ends to the front and rear gangs respectively, said links so positioned that straight lines passing through their respective pivots intersect, the forward pivot of said links being located on one side of the longitudinal center of the front gang, and the pivots of the rearward end of said links being located on the opposite sides of the longitudinal center of the rear gang, relatively movable draft connections connected to the front gang frame, and means operatively connecting said draft connections with one of said links, whereby said gangs may be adjusted to various working angles regardless of whether the harrow is offset to the right or left of the draft appliance.

9. A tandem offset disk harrow comprising a front frame and a rear frame, disk gangs mounted in each of said frames, means including a plurality of links pivoted at their forward and rearward ends to the front and rear frame respectively, said links being so located that straight lines passing through the respective pivot of the links intersect, the forward pivots of said links being located on one side of the longitudinal center of the front gang, and the pivots of the rear end of said links being located on the opposite sides of the longitudinal center of the rear gang, means located on one side of said frame for locking said gangs in various angular relations with respect to each other, relatively movable draft connections connected to the front gang frame, and a connecting bar operatively connecting said draft connection with one of said links whereby the angular relation of said gangs with respect to each other may be adjusted regardless of the relative position of the harrow with respect to the draft appliance.

10. A tandem offset disk harrow comprising a front frame and a rear frame, disk gangs mounted in each of said frames, means including a plurality of links pivoted at their forward and rearward ends to the front and rear gangs respectively, a draft member pivoted to said front frame for vertical and horizontal movement with respect thereto, a second draft member having its forward end pivoted to said first draft member, a bell crank pivoted to said front frame and having one arm thereof pivoted to said second draft member, and a connecting bar having its forward end pivoted to the other arm of said bell crank, and its rearward end pivotally connected to one of said links whereby the angular adjustment of said gangs may be effected regardless of whether the harrow is offset to the right or left of the draft appliance.

11. A tandem disk harrow comprising a front frame and a rear frame, disk gangs mounted in each of said frames, means for pivotally connecting said frames together, and relatively movable draft means connected to the front frame and operatively connected to said first named means for controlling the angular movement of said gangs with respect to each other.

12. A tandem disk harrow comprising a front frame and a rear frame, disk gangs mounted in each of said frames, means for pivotally connecting said frames together, and a pivoted draft frame carried by the front gang frame and operatively related to said first named means for controlling the angular movement of said gangs with respect to each other.

13. A tandem disk harrow comprising a front frame and a rear frame, disk gangs mounted in each of said frames, means for pivotally connecting said frames together, draft connections for the front frame, and means for operatively connecting said draft connections with said first named means for controlling the angular movement of said gangs with respect to each other.

14. A tandem disk harrow comprising a front frame and a rear frame, disk gangs mounted in each of said frames, means for pivotally connecting said frames together, movable draft connections for said front frame, and means forming the connection between said movable draft connection and said first named means for controlling the angular movement of said gangs with respect to each other.

In testimony whereof I have signed my name to this specification, on this 26th day of Oct., A. D. 1929.

WILLIAM D. DEWEND.